United States Patent
Pahwa et al.

(10) Patent No.: US 10,848,544 B2
(45) Date of Patent: Nov. 24, 2020

(54) COMMUNICATING MAPPING APPLICATION DATA BETWEEN ELECTRONIC DEVICES

(71) Applicant: Apple Inc., Cupertino, CA (US)

(72) Inventors: Aroon Pahwa, Palo Alto, CA (US); Matthew B. Ball, South San Francisco, CA (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 14/842,769

(22) Filed: Sep. 1, 2015

(65) Prior Publication Data
US 2016/0065650 A1 Mar. 3, 2016

Related U.S. Application Data

(60) Provisional application No. 62/044,937, filed on Sep. 2, 2014.

(51) Int. Cl.
*H04L 29/08* (2006.01)
*G06F 16/29* (2019.01)
*G06F 16/9535* (2019.01)

(52) U.S. Cl.
CPC ............. *H04L 67/06* (2013.01); *G06F 16/29* (2019.01); *G06F 16/9535* (2019.01); *H04L 67/02* (2013.01)

(58) Field of Classification Search
CPC ... H04L 67/06; H04L 67/02; G06F 17/30241; G06F 17/30867; G06F 16/29; G06F 16/9535
See application file for complete search history.

(56) References Cited

U.S. PATENT DOCUMENTS 7,003,463 B1 * 2/2006 Maes ................ H04L 29/06027
704/231
7,461,120 B1 * 12/2008 Artz, Jr. .................. H04L 63/10
707/999.01

(Continued)

FOREIGN PATENT DOCUMENTS

WO PCT/US2015/047993     9/2015
WO     2016036769 A2     3/2016

OTHER PUBLICATIONS

PCT International Search Report and Written Opinion for commonly owned International Patent Application PCT/US2015/047993, dated Mar. 10, 2016, 17 pages, Apple Inc., listed as item #3 in the 1449 filed Feb. 29, 2016.

*Primary Examiner* — Oanh Duong
(74) *Attorney, Agent, or Firm* — Invoke

(57) ABSTRACT

The present disclosure relates to systems and processes for efficiently communicating mapping application data between electronic devices. In one example, a first electronic device can act as a proxy between a second electronic device and a map server by receiving a first request for map data from the second user device, determining a set of supplemental data to add to the first request to generate a complete second request for map data, and transmitting the second request to a map server. The first electronic device can receive the requested map data from the map server and transmit the received map data to the second electronic device. In another example, the first electronic device can act as a navigation server for the second electronic device by initially transmitting a full set of route data to the second electronic device and subsequently transmitting route update messages to the second electronic device.

25 Claims, 13 Drawing Sheets

(56) References Cited

U.S. PATENT DOCUMENTS

| | | | |
|---|---|---|---|
| 7,483,025 B2 * | 1/2009 | Roy | G06T 11/60 345/440 |
| 7,574,486 B1 * | 8/2009 | Cheng | H04L 67/02 709/219 |
| 8,201,082 B1 | 6/2012 | Nordstrom et al. | |
| 2002/0165955 A1 | 11/2002 | Johnson et al. | |
| 2005/0140524 A1 * | 6/2005 | Kato | G08G 1/096811 340/995.13 |
| 2006/0205420 A1 * | 9/2006 | Bibr | H04W 28/24 455/466 |
| 2007/0037587 A1 * | 2/2007 | Mohi | G01C 21/20 455/456.5 |
| 2008/0010410 A1 * | 1/2008 | Zilbershtein | H04L 67/06 711/118 |
| 2009/0280861 A1 | 11/2009 | Khan | |
| 2010/0088014 A1 * | 4/2010 | Carandini | G06F 17/30241 701/532 |
| 2011/0131238 A1 * | 6/2011 | Peeters | G07B 15/063 707/769 |
| 2012/0191773 A1 * | 7/2012 | Appleton | G06F 17/30902 709/203 |
| 2012/0271848 A1 * | 10/2012 | Kadowaki | G09B 29/007 707/769 |
| 2013/0104035 A1 * | 4/2013 | Wagner | H04W 4/029 715/240 |
| 2013/0111463 A1 * | 5/2013 | Khushraj | G06F 8/61 717/174 |
| 2013/0151645 A1 * | 6/2013 | Siliski | G06F 17/30902 709/213 |
| 2013/0262675 A1 * | 10/2013 | Tiger | H04L 65/40 709/225 |
| 2014/0012951 A1 * | 1/2014 | Bryan | G06F 9/541 709/219 |
| 2014/0359510 A1 * | 12/2014 | Graf | G01C 21/3667 715/771 |
| 2015/0019673 A1 * | 1/2015 | Bayerl | H04L 67/1097 709/213 |
| 2016/0003623 A1 * | 1/2016 | Venkatraman | H04W 76/10 701/410 |
| 2016/0034495 A1 * | 2/2016 | Yano | G09B 29/00 707/695 |
| 2016/0045971 A1 * | 2/2016 | Holverson | B23K 9/1087 219/132 |
| 2016/0375364 A1 * | 12/2016 | Mikhailov | A63F 13/06 463/29 |

* cited by examiner

COMMUNICATING MAPPING APPLICATION DATA BETWEEN ELECTRONIC DEVICES

BACKGROUND

1. Field

The present disclosure relates generally to mapping applications executed by electronic devices and, more specifically, to efficiently communicating mapping application data between communicatively coupled electronic devices.

2. Description of Related Art

With the increased popularity of mobile electronic devices, it is not uncommon for a user to carry more than one mobile electronic device. For example, a user can have both a mobile phone and a wearable electronic device, such as a watch. Many of these devices are capable of determining their location using various technologies. While a device's location can be used to improve the performance of applications running on the device, such as mapping and navigation, weather, Internet browsing, recommendation, and other applications, current mobile electronic devices fail to efficiently communicate with one another and are often constrained in their ability to communicate by communication channels having limited bandwidths.

Accordingly, there is a need for improved processes for communicating between electronic devices.

BRIEF SUMMARY

The present disclosure relates to systems and processes for efficiently communicating mapping application data between electronic devices. In one example, a first electronic device can act as a proxy between a second electronic device and a map server by receiving a first request for map data from the second user device, determining a set of supplemental data to add to the first request to generate a complete second request for map data, and transmitting the second request to a map server. The first electronic device can receive the requested map data from the map server and transmit the received map data to the second electronic device. In another example, the first electronic device can act as a navigation server for the second electronic device by initially transmitting a full set of route data to the second electronic device and subsequently transmitting route update messages to the second electronic device.

DETAILED DESCRIPTION

The following description sets forth exemplary methods, parameters and the like. It should be recognized, however, that such description is not intended as a limitation on the scope of the present disclosure but is instead provided as a description of exemplary embodiments.

The present disclosure relates to systems and processes for efficiently communicating mapping application data between electronic devices. In one example, a first electronic device can act as a proxy between a second electronic device and a map server by receiving a first request for map data from the second user device, determining a set of supplemental data to add to the first request to generate a complete second request for map data, and transmitting the second request to a map server. The first electronic device can receive the requested map data from the map server and transmit the received map data to the second electronic device. In another example, the first electronic device can act as a navigation server for the second electronic device by initially transmitting a full set of route data to the second electronic device and subsequently transmitting route update messages to the second electronic device.

Figure 2:
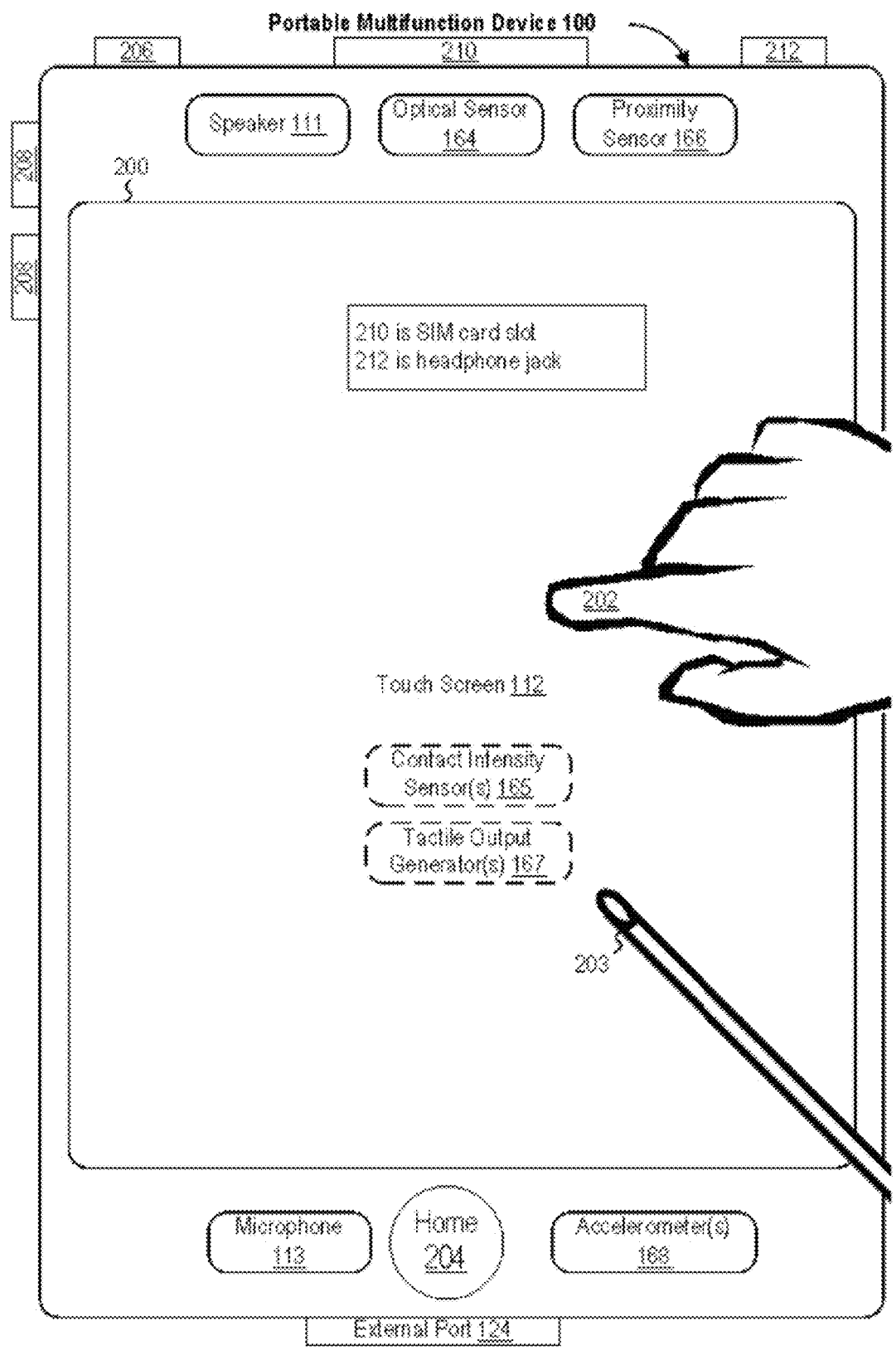
FIG. 2 illustrates a portable multifunction device having a touch-sensitive display in accordance with some examples.
Figure 3:
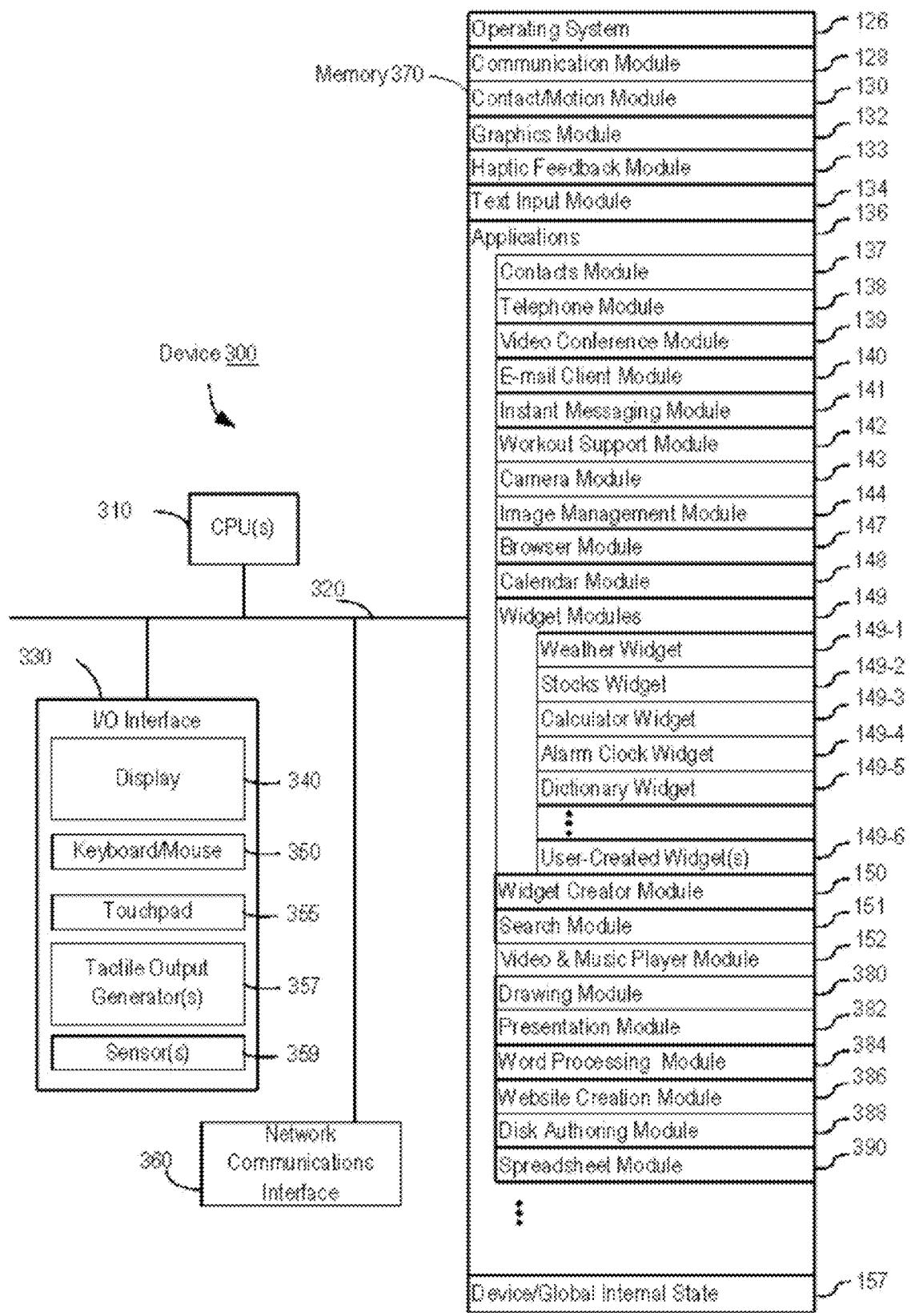
FIG. 3 is a block diagram of an exemplary multifunction device with a display and a touch-sensitive surface in accordance with some examples.
Figure 4A:
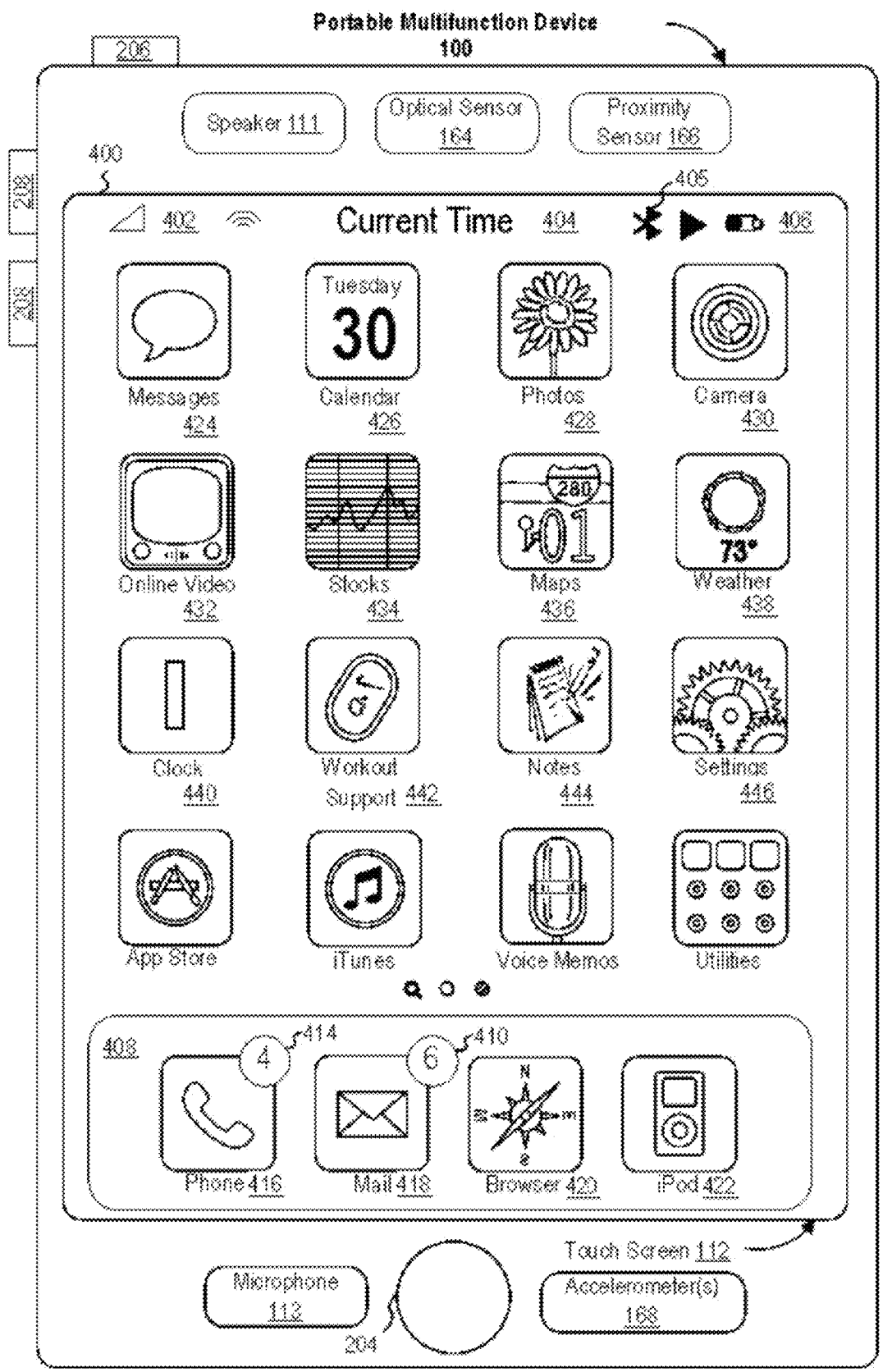
FIGS. 4A and 4B illustrate an exemplary user interface for a menu of applications on a portable multifunction device in accordance with some examples.
Figure 4B:
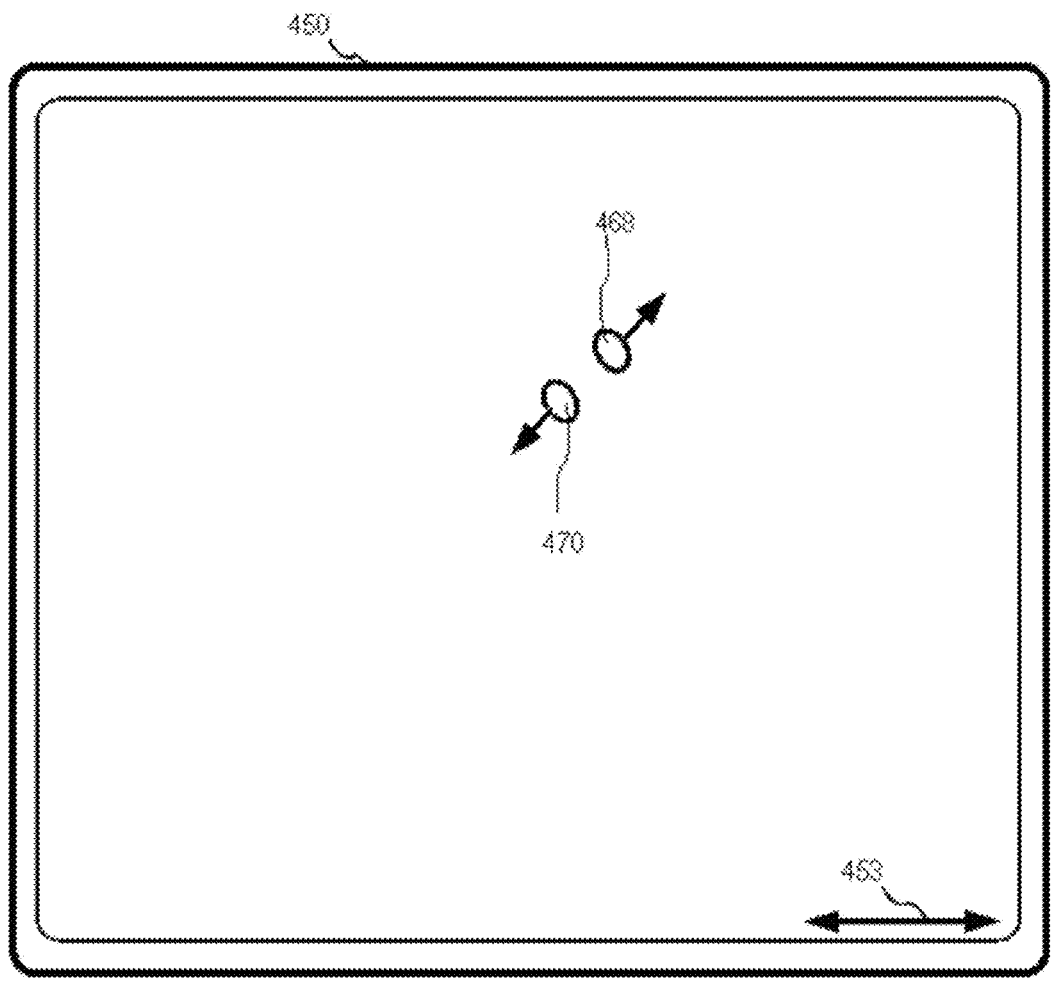
Figure 4B:
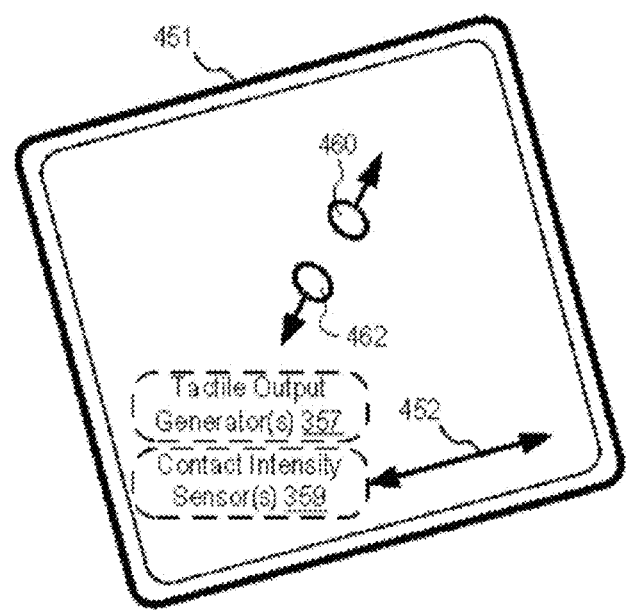

Below, FIGS. 1A-1B, 2, 3, and 5A-5B provide a description of exemplary devices for efficiently communicating mapping application data between communicatively coupled electronic devices. FIGS. 4A-4B illustrate exemplary user interfaces that can be displayed on these exemplary devices.

Although the following description uses terms first, second, etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
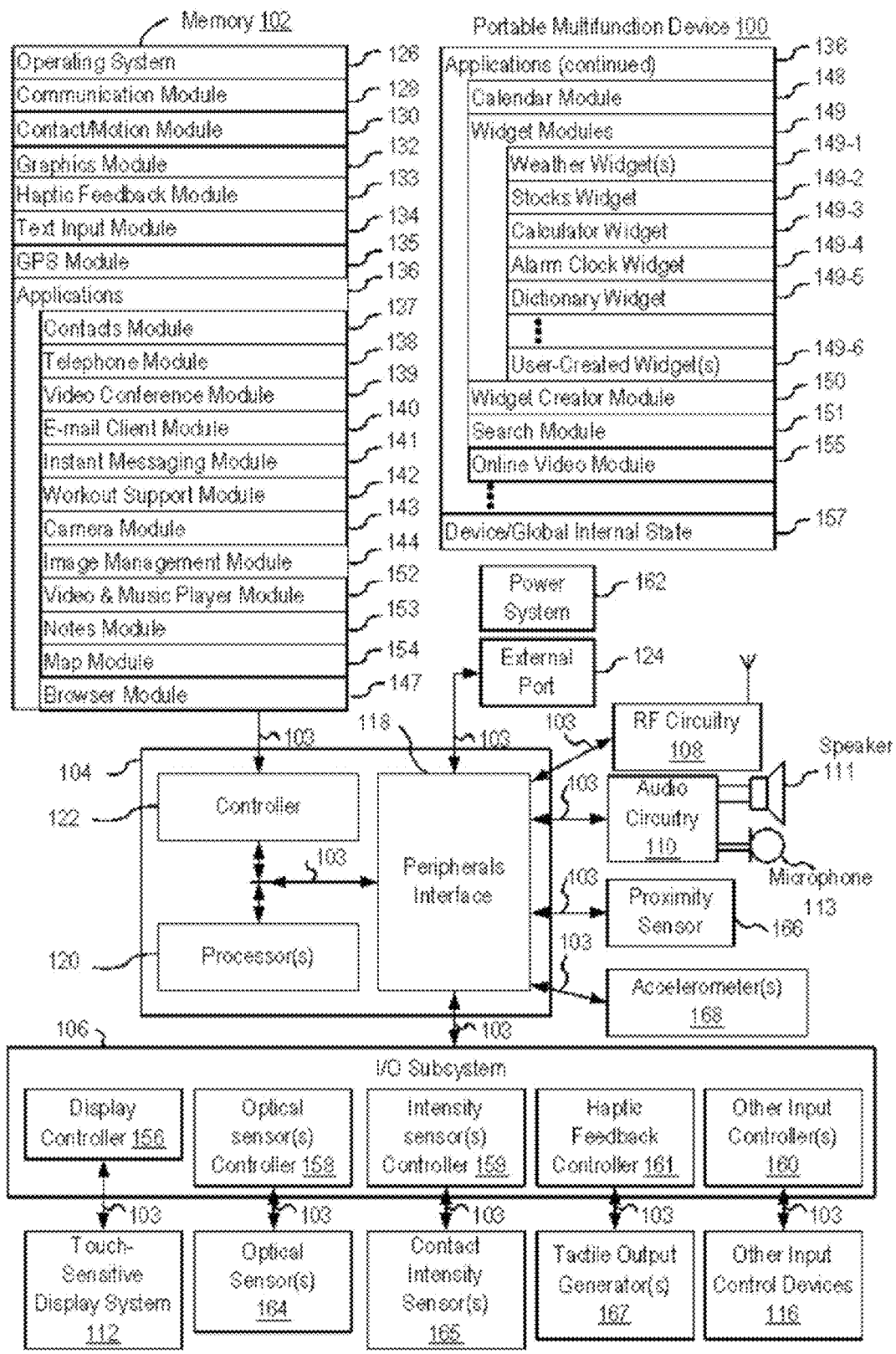
FIG. 1A is a block diagram illustrating a portable multifunction device with a touch-sensitive display in accordance with some examples.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 may include one or more computer readable storage mediums. The computer readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web-pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Figure 1B:
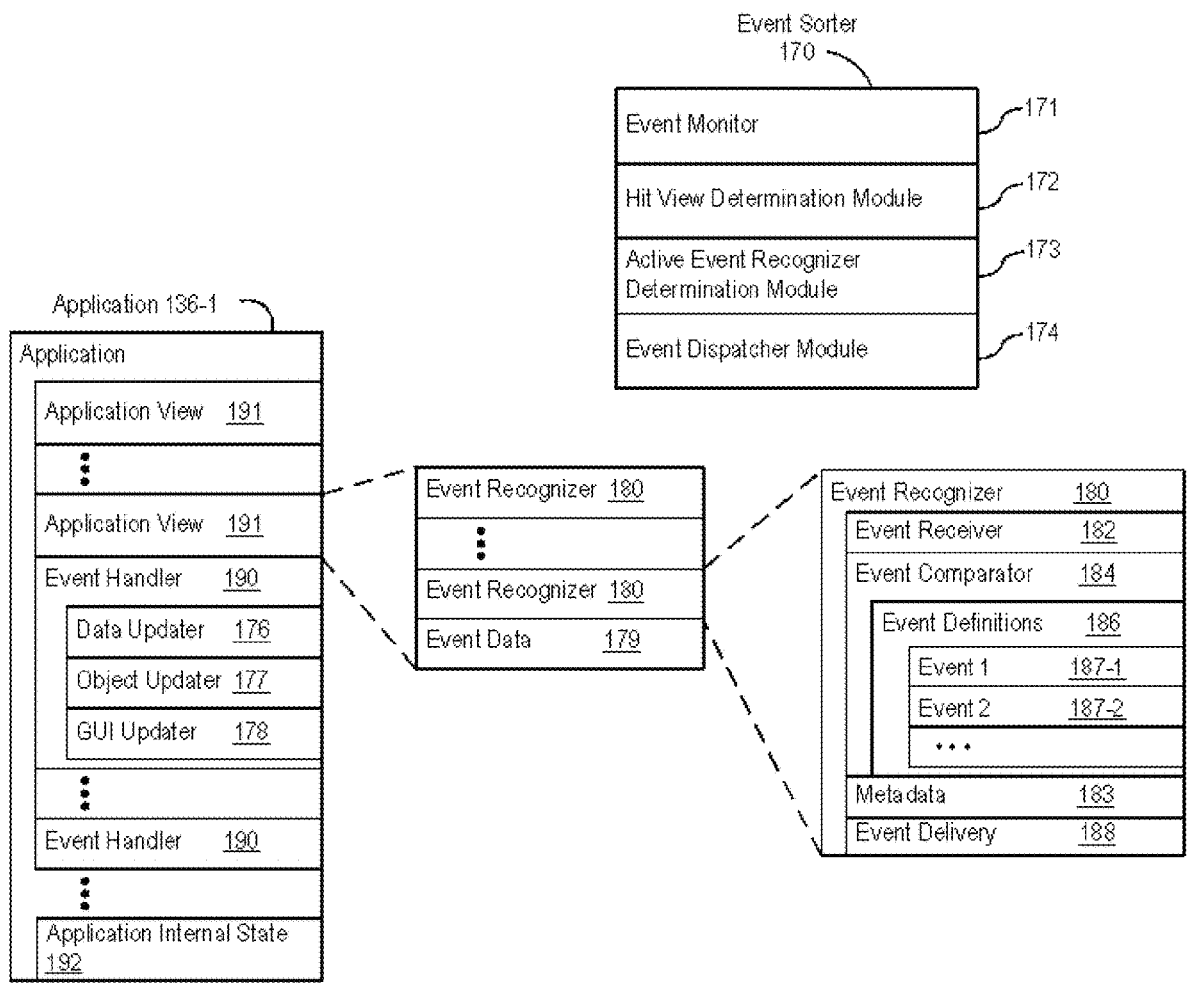
FIG. 1B is a block diagram illustrating exemplary components for event handling in accordance with some examples.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod® (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
video player module 145;
music player module 146;
browser module 147;
calendar module 148;
widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which merges video player module 145 and music player module 146;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web-pages or portions thereof, as well as attachments and other files linked to web-pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web-page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 may be stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icons 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
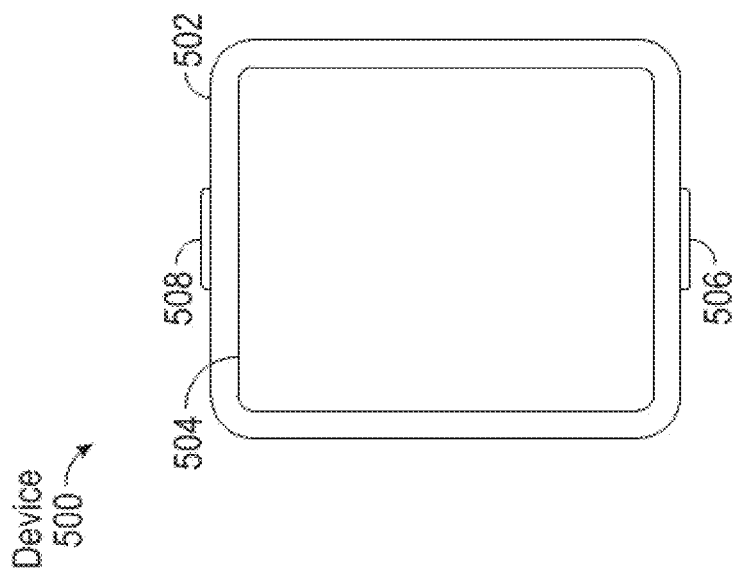
FIG. 5A is a block diagram illustrating a portable multifunction device with a touch-sensitive display in accordance with some examples.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touchscreen 504. Alternatively, or in addition to touchscreen 504, device 500 has a display and a touch-sensitive surface. As with devices 100 and 300, in some embodiments, touchscreen 504 (or the touch-sensitive surface) may have one or more intensity sensors for detecting intensity of contacts (e.g., touches) being applied. The one or more intensity sensors of touchscreen 504 (or the touch-sensitive surface) can provide output data that represents the intensity of touches. The user interface of device 500 can respond to touches based on their intensity, meaning that touches of different intensities can invoke different user interface operations on device 500. As used here, the term "intensity" of a contact (or touch) on touchscreen 504 (or the touch-sensitive surface) refers to the force or pressure (force per unit area) of a touch (e.g., a finger) on the touchscreen.

Techniques for detecting and processing touch intensity may be found, for example, in related applications: International Patent Application Serial No. PCT/US2013/040061, entitled "Device, Method, and Graphical User Interface for Displaying User Interface Objects Corresponding to an Application," filed May 8, 2013 and International Patent Application Serial No. PCT/US2013/069483, entitled "Device, Method, and Graphical User Interface for Transitioning Between Touch Input to Display Output Relationships," filed Nov. 11, 2013.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
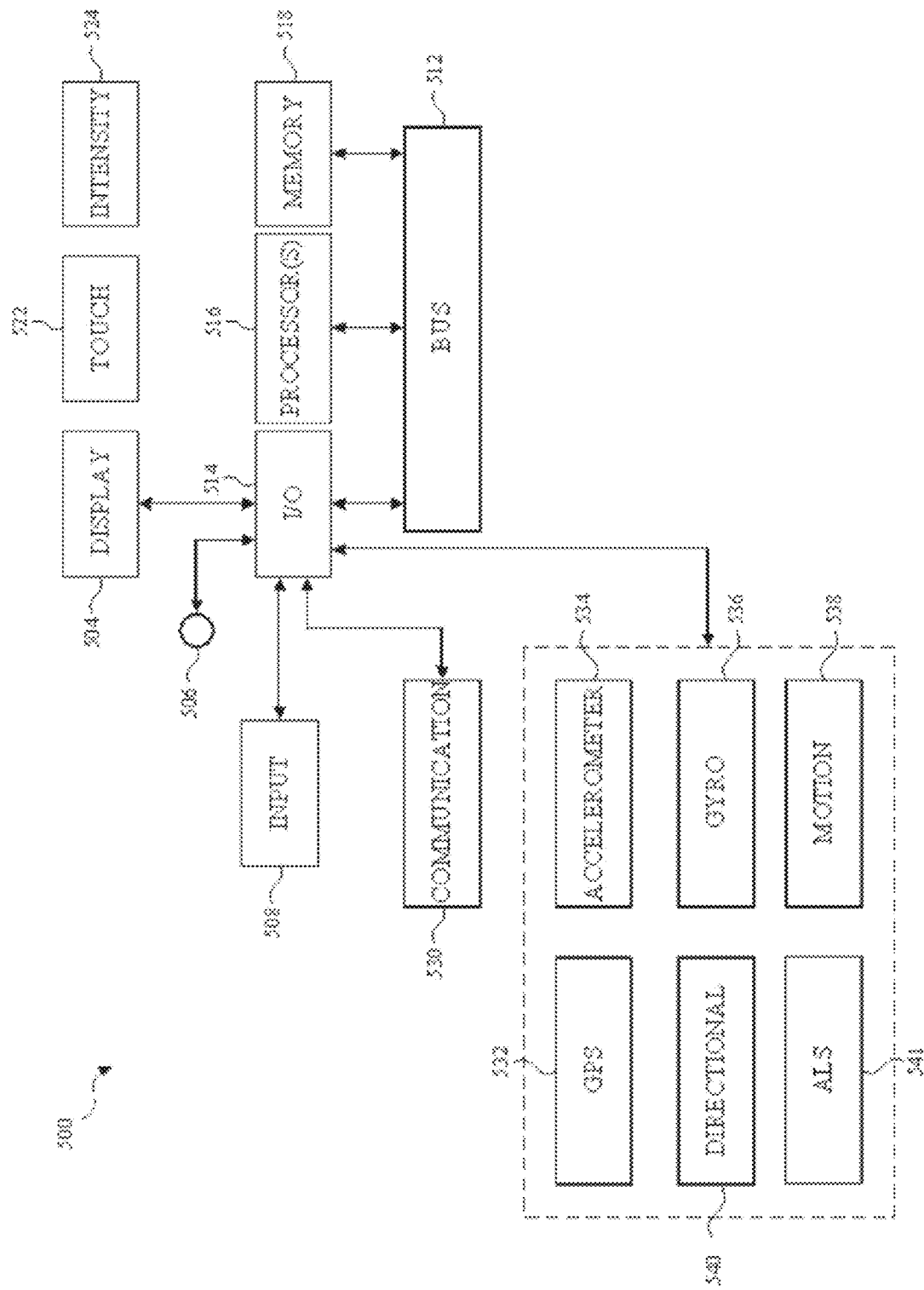
FIG. 5B illustrates a portable multifunction device having a touch-sensitive display in accordance with some examples.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth™, near field communication ("NFC"), cellular and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Computing device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of computing device 500 can be a non-transitory computer readable storage medium, for storing computer-executable instructions, which, when executed by one or more computer processors 516, for example, can cause the computer processors to perform the techniques described above, including processes 700 and 800 (FIGS. 7-8). The computer-executable instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer readable storage medium" can be any medium that can tangibly contain or store computer-executable instructions for use by or in connection with the instruction execution system, apparatus, or device. The non-transitory computer readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Computing device 500 is not limited to the components and configuration of FIG. 5B, but can include other or additional components in multiple configurations.

As used here, the term "affordance" refers to a user-interactive graphical user interface object that may be displayed on the display screen of device 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the third threshold results in a third operation. In some embodiments, a comparison between the characteristic intensity and one or more thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm may be an unweighted sliding-average smoothing algorithm, a triangular smoothing algorithm, a median filter smoothing algorithm, and/or an exponential smoothing algorithm. These smoothing algorithms may eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments the contact-detection intensity threshold is zero. In some embodiments the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the term "open application" or "executing application" refers to a software application with retained state information (e.g., as part of device/global internal state 157 and/or application internal state 192). An open or executing application may be any one of the following types of applications:
 an active application, which is currently displayed on a display screen of the device that the application is being used on;
 a background application (or background processes) which is not currently displayed, but one or more processes for the application are being processed by one or more processors; and
 a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Figure 6:
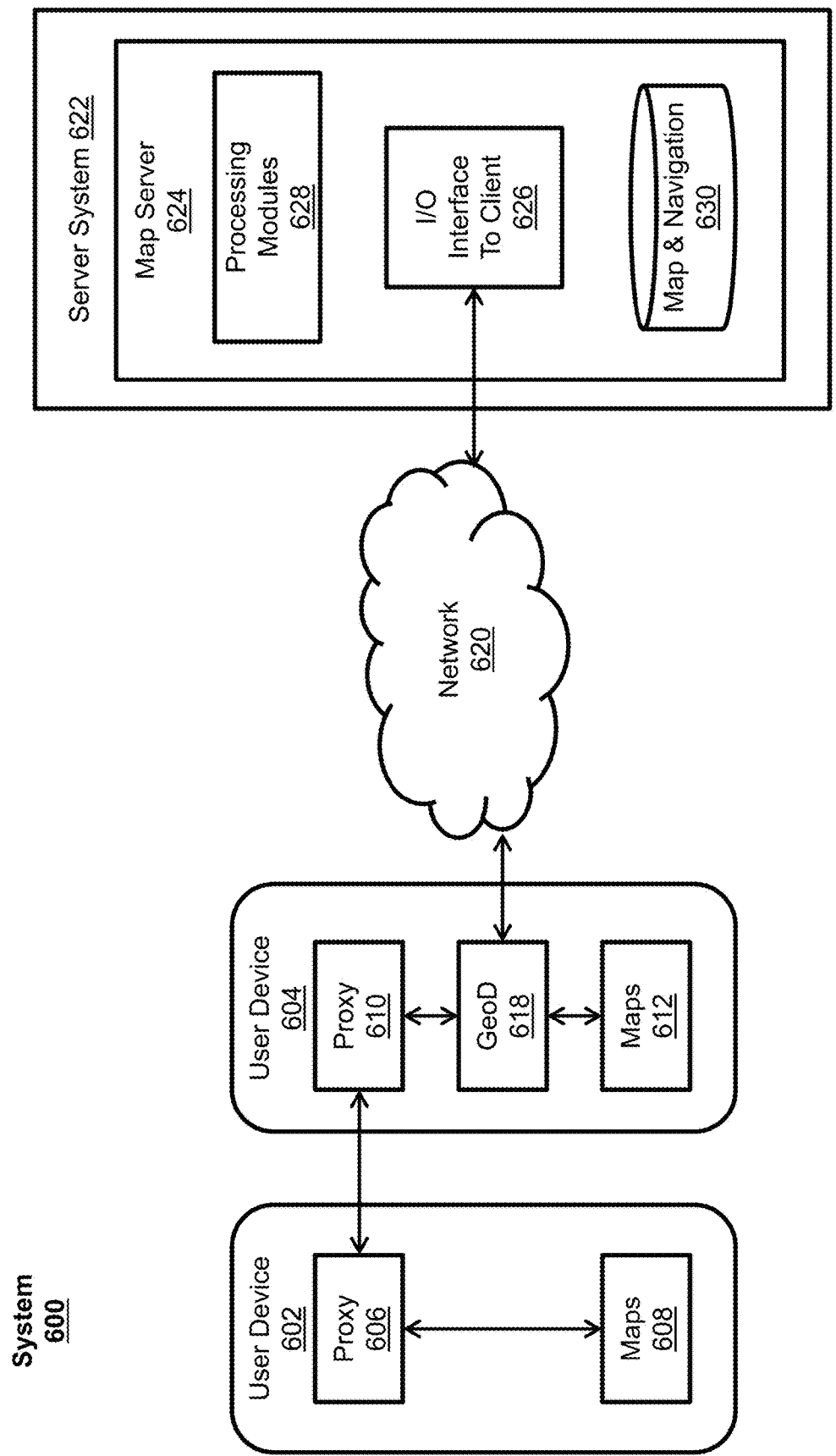
FIG. 6 illustrates a block diagram of an exemplary system for efficiently communicating mapping application data between communicatively coupled electronic devices according to various examples.

FIG. 6 illustrates an exemplary mapping and navigation system 600 for efficiently communicating mapping application data between communicatively coupled electronic devices according to various examples. As shown, in some examples, system 600 can be implemented according to a client-server model. The mapping and navigation system 600 can include a client-side portion executed on a user device 602 and/or 604, and a server-side portion executed on a server system 622. User device 602 and/or 604 can include any electronic device, such as device 100, 300, or 500, and can communicate with server system 622 through one or more networks 620, which can include the Internet, an intranet, or any other wired or wireless public or private network.

Server system 622 can provide server-side functionalities for any number of clients residing on respective user devices 602 and 604 and can include one or more map servers 624 that can include a client-facing I/O interface 626, one or more processing modules 628, and map and navigation data storage 630. The client-facing I/O interface 626 can facilitate the client-facing input and output processing for map server 624. The one or more processing modules 628 can utilize map and navigation data storage 630 to provide appropriate map tiles for display on user device 602 and/or 604, provide geocoding and reverse geocoding functions, provide navigation and routing functions to determine directions from a start location to and end location, provide traffic information, and the like. Server system 622 can be implemented on one or more standalone data processing devices or a distributed network of computers. In some examples, server system 622 can employ various virtual devices and/or services of third party service providers (e.g., third-party cloud service providers) to provide the underlying computing resources and/or infrastructure resources of server system 622.

The client-side portion executed on user devices 602 and 604 can include mapping and navigation applications 608 and 612, respectively, which can provide client-side functionalities, such as user-facing input and output processing and communications with server system 622. In some examples, user device 604 can include a geo-daemon 618 ("GeoD") for communicating with server system 622. Geo-daemon 618 can, in some examples, be used to transmit location information (e.g., geographical coordinates of user device 604) determined by user device 604 (e.g., using Wi-Fi, cellular, GPS, GLONASS, or the like) and/or requests for map data to server system 622 via network 620 and can be used to receive map data from server system 622. The location information and/or requests for map data can be transmitted periodically, intermittently, in response to an input from a user, in response to a request by mapping and navigation application 612, or at any other desired frequency or interval of time. The map data can include any type of mapping and navigation data, such as map tiles for display on user device 604, geocoding and/or reverse geocoding information, directions from a start location to and end location, traffic information, and the like. Mapping and navigation application 612 can monitor geo-daemon 618 for state changes caused by updated map data received from server system 622 and can update its output accordingly.

In some examples, user device 604 can be communicatively coupled with another user device 602 via a direct communication connection, such as Bluetooth, NFC, BTLE, or the like, or via a wired or wireless network, such as a local Wi-Fi network. In these examples, user device 604 can include a proxy module 610 for communicating with proxy module 606 of user device 602 to allow user device 604 to act as a proxy between user device 602 and server system 622. For example, mapping and navigation application 608 can transmit location information (e.g., geographical coordinates of user device 602) determined by user device 602 (e.g., using Wi-Fi, cellular, GPS, GLONASS, or the like)

and/or requests for map data to user device 604 via proxy module 606 and proxy module 610. These geographical coordinates and/or requests for map data can be provided to geo-daemon 618, which can then communication this information to server system 622. Server system 622 can process the received information and return map data to geo-daemon 618 of user device 604. Proxy module 610 can monitor geo-daemon 618 for state changes caused by updated map data received from server system 622 and can communicate these changes to mapping and navigation application 608 via proxy module 606. This system architecture advantageously allows a user device 602 having limited communication capabilities and/or limited battery power, such as a watch or other compact electronic device, to utilize the mapping and navigation services provided by server system 622 by using a user device 604 having greater communication capabilities and/or battery power, such as a mobile phone, laptop computer, tablet computer, or the like, as a proxy to server system 622. While only two user devices 602 and 604 are shown in FIG. 6, it should be appreciated that system 600 can include any number and type of user devices configured in this proxy configuration to communicate with server system 622.

As described in greater detail below with respect to FIG. 7, user device 604 can be used as a proxy between user device 602 and server system 622. In this configuration, user device 602 can be configured to communicate abbreviated requests for map data to user device 604 to reduce the amount of data transmitted from user device 602 to user device 604 when requesting map data. User device 604 can determine supplemental information to add to the abbreviated request to generate a complete request for map data to transmit to server system 622. Additionally, as described in greater detail below with respect to FIG. 8, user device 604 can act as a navigation server for user device 602. In this configuration, user device 604 can be configured to transmit a complete set of map data, such as navigation or routing data, to user device 602 in response to receiving the same from server system 622. However, in response to receiving updated map data from server system 622 or in response to determining that a location of the user has changed, user device 604 can be configured to transmit smaller route update messages to user device 602 that reflect changes contained in the updated map data or changes in the user's progression along the route. This advantageously reduces the amount of data transmitted between user devices 602 and 604 and the power needed to transmit this data. This can be particularly beneficial when the communication channel between user devices 602 and 604 has a limited bandwidth and/or when one or both of user devices 602 and 604 have limited battery power (e.g., if one or both are a watch or other compact electronic device).

Although the functionality of the mapping services are shown in FIG. 6 as including both a client-side portion and a server-side portion, in some examples, the functions of the mapping services can be implemented as a standalone application installed on a user device. In addition, the division of functionalities between the client and server portions of the mapping services can vary in different examples. For instance, in some examples, the client executed on user device 602 or 604 can be a thin-client that provides only user-facing input and output processing functions, and delegates all other functionalities of the mapping services to a backend server.

Figure 7:
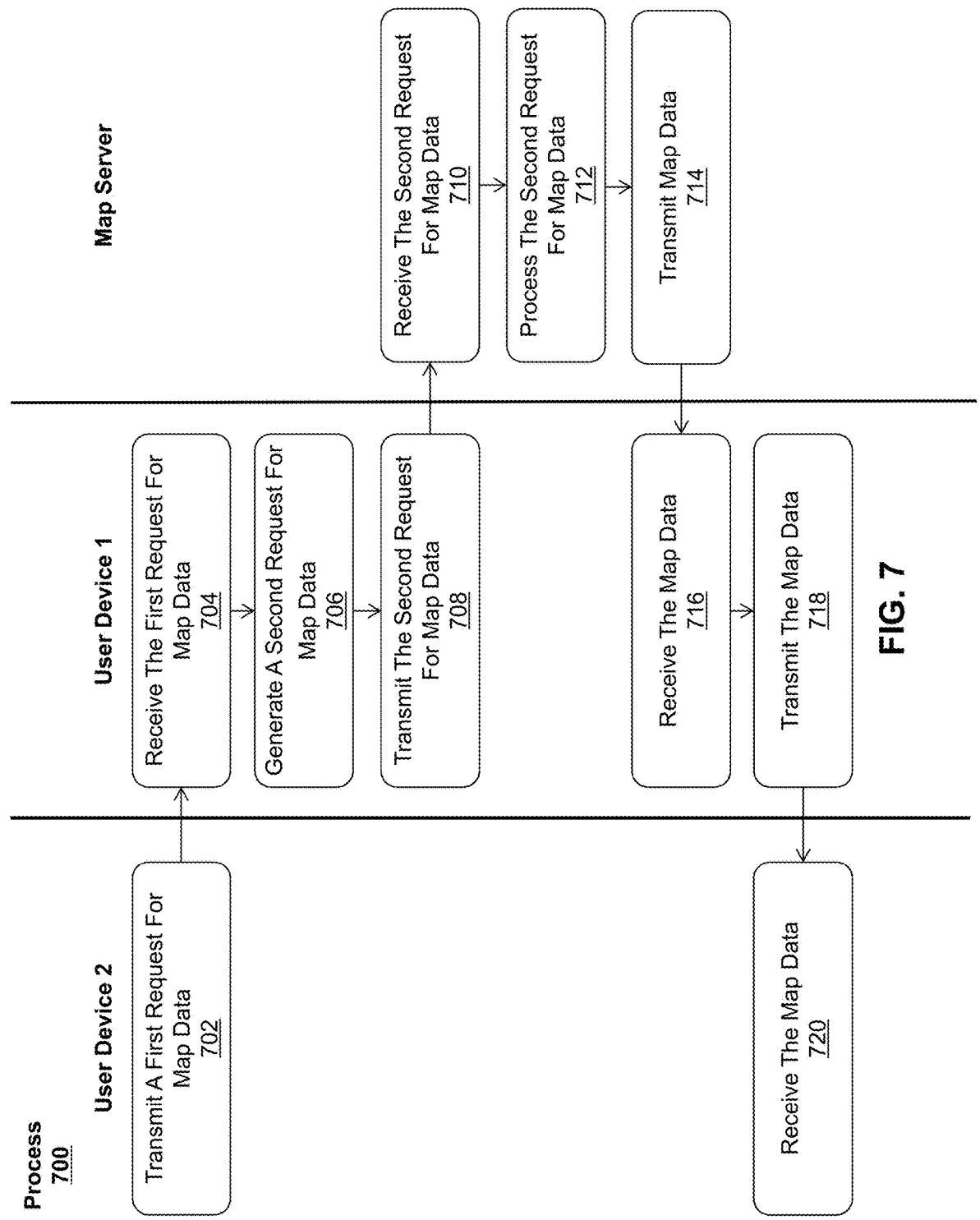
FIG. 7 illustrates an exemplary process for efficiently communicating mapping application data between communicatively coupled electronic devices according to various examples.

FIG. 7 illustrates an exemplary process 700 for efficiently communicating mapping application data between communicatively coupled electronic devices according to various examples. In some examples, process 700 can be performed using electronic devices similar or identical to device 100, 300, 500, 602, or 604.

At block 702, one or more processors (e.g., processors 120, CPU(s) 310, or processor(s) 516) of a second user device (e.g., user device 602) can transmit a first request for map data to a first user device (e.g., user device 604). The first request for map data can originate from a process or software application running on the second user device (e.g., mapping and navigation application 608) and can be transmitted to the first user device via a direct communication connection, such as Bluetooth, NFC, BTLE, or the like, or via a wired or wireless network, such as a local Wi-Fi network. In some examples, a proxy module (e.g., proxy module 606) of the second user device can be used to transmit the first request to a proxy module (e.g., proxy module 610) of the first user device. The first request can be an abbreviated request that generally includes a minimal amount of information that is sufficient to allow the first user device to generate a complete request for the map data to be sent to a map server. For example, the first request can include geographic coordinates of the second user device determined by the second user device using any desired location determination technology, such as GPS or GLONASS (e.g., using GPS module 135, sensors 359, or GPS sensor 532), Wi-Fi or cellular (e.g., using RF circuitry 108, network communication interface 360, or communication unit 530), or the like. For example, the second user device can receive location information from GPS satellites, nearby Wi-Fi base stations, and/or nearby cell towers, as described in U.S. patent application Ser. No. 12/040,283, "Location Determination," filed Feb. 29, 2008; Ser. No. 12/103,330, "Location Determination Using Formula," filed Apr. 15, 2008; and Ser. No. 12/122,339, "Location Determination," filed May 16, 2008, each of which is incorporated by reference herein in their entirety for all purposes. In some examples, the first request can additionally or alternatively include an indication of a type of map data requested, such as map tile data, geographical coordinates produced by a geocoding operation, the results of a reverse geocoding operation using geographical coordinates provided by the second user device, routing data from a start location to an end location, traffic data, or the like. In some examples, the first request can exclude certain types of information typically included in complete request for map data sent to a map server, such as a URL of the map server, an HTTP request for the map data, software versioning information associated with one or more programs on the second user device (e.g., mapping and navigation application 608, an operating system of the second user device, or the like), a device identification of the second user device, one or more properties of the second user device (e.g., screen size, screen resolution, etc.), or the like.

At block 704, the first user device can receive the first request transmitted by the second user device at block 702. At block 706, the first user device can generate a second request for map data based on the first request for map data received at block 704. The second request for map data can generally include a request formatted and containing information in a manner that the map server is configured to receive. In some examples, generating the second request for map data based on the first request for map data can include extracting a set of data from the first request for map data. The data extracted from the first request for map data can include geographic coordinates of the second user device, a type of data requested by the second user device, or the like. Generating the second request for map data can further include determining a supplemental set of data that is to be added to the extracted data in order to generate a complete request for map data to be sent to a map server. The supplemental set of data can include any type of information absent from the first request that is needed to generate a complete request for map data, such as URL of the map server, an HTTP request for the map data, software versioning information associated with one or more programs on the second user device (e.g., mapping and navigation application 608, an operating system of the second user device, or the like), a device identification of the second user device, one or more properties of the second user device (e.g., screen size, screen resolution, etc.), or the like.

In some examples, prior to performing process 700, the first and second user devices can be paired (e.g., Bluetooth pairing) to allow the devices to recognize each other and securely communicate with one another. During or after this pairing process, some or all of the data used to generate the supplemental set of data can be transmitted from the second user device to the first user device. For example, during or after the pairing process, the second user device can transmit its software versioning information, device identification, one or more properties of the device (e.g., screen size, screen resolution, etc.), or the like. The first user device can store the received information in a memory on the device for later use. In this way, the data used to generate the supplemental set of data can be transmitted only once to reduce the amount of data required to be transmitted from the second user device to the first user device when making map data requests.

Once the supplemental set of data that is to be added to the data extracted from the first request is determined, the first user device can combine the supplemental set of data and the data extracted from the first request to generate a second (complete) request for map data to be sent to the map server. In some examples, the second request for map data can include similar information and can be formatted in a similar manner as a request for map data generated by the first user device. For example, the second request can include an HTTP formatted request for data including geographic coordinates of the second user device, a URL of the map server, software versioning information associated with the second user device, a device identification of the second user device, one or more properties of the device (e.g., screen size, screen resolution, etc.), or the like.

At block 708, the first user device can transmit the second request for map data generated at block 706 to a map server (e.g., server system 622). In some examples, the second request for map data can be transmitted using a daemon (e.g., geo-daemon 618) to the map server via a network (e.g., network 620).

At block 710, the map server can receive the second request for map data. At block 712, the map server can process the request to obtain the requested map data. The processing performed at block 712 can include any type of mapping and/or navigation function that can depend on the type of the second request. For example, the processing performed at block 712 can include performing geocoding, reverse geocoding, navigation and routing functions, map tile acquisition, traffic information gathering, or any other desired mapping and/or navigating functions. Thus, in some examples, the map data can include map tiles to be displayed on a user device, routing information containing directions from a start location to an end location, geographic coordinates, textual descriptions and/or visual representations of a location, point of interest, or object of interest, or the like. At block 714, the map server can transmit the map data generated at block 712 to the first user device via a network (e.g., network 620).

At block 716, the map data can be received by the first user device. In some examples, the first user device can receive the map data using a geo-daemon (e.g., geo-daemon 618). At block 718, the first user device can transmit the map data received at block 716 to the second user device. In some examples, the map data can be transmitted to the second user device via a direct communication connection, such as Bluetooth, NFC, BTLE, or the like, or via a wired or wireless network, such as a local Wi-Fi network. A proxy module (e.g., proxy module 610) of the first user device can monitor the geo-daemon and can be used to transmit the map data to a proxy module (e.g., proxy module 606) of the first user device in response to detecting a change in the state of the geo-daemon. In some examples, the map data transmitted at block 718 can be the same as the map data received at block 716. In other examples, as described in greater detail below with respect to FIG. 8, the map data transmitted at block 718 can include a compressed or reduced-size version of the map data received at block 716.

At block 720, the second user device can receive the map data. In some examples, the second user device can use a proxy module (e.g., proxy module 606) to receive the map data. The received data can then be provided to the process or application (e.g., mapping and navigation application 608) that requested the map data.

Using process 700, a first user device can advantageously be used as a proxy between a second user device and a map server. Additionally, by allowing the second user device to request map data using an abbreviated request for map data, the amount of data transmitted between the first user device and the second user device can be reduced, thereby reducing the amount of time and power required to request map data. Yet another advantage of process 700 is that the communication protocol between the first user device and the map server need not be altered since the first user device supplements the abbreviated request for map data generated by the second user device with the additional information needed to generate a complete request for map data. In this way, the map server can receive and process requests for map data made by the second user device in the same way that it would process requests for map data made by the first user device.

Figure 8:
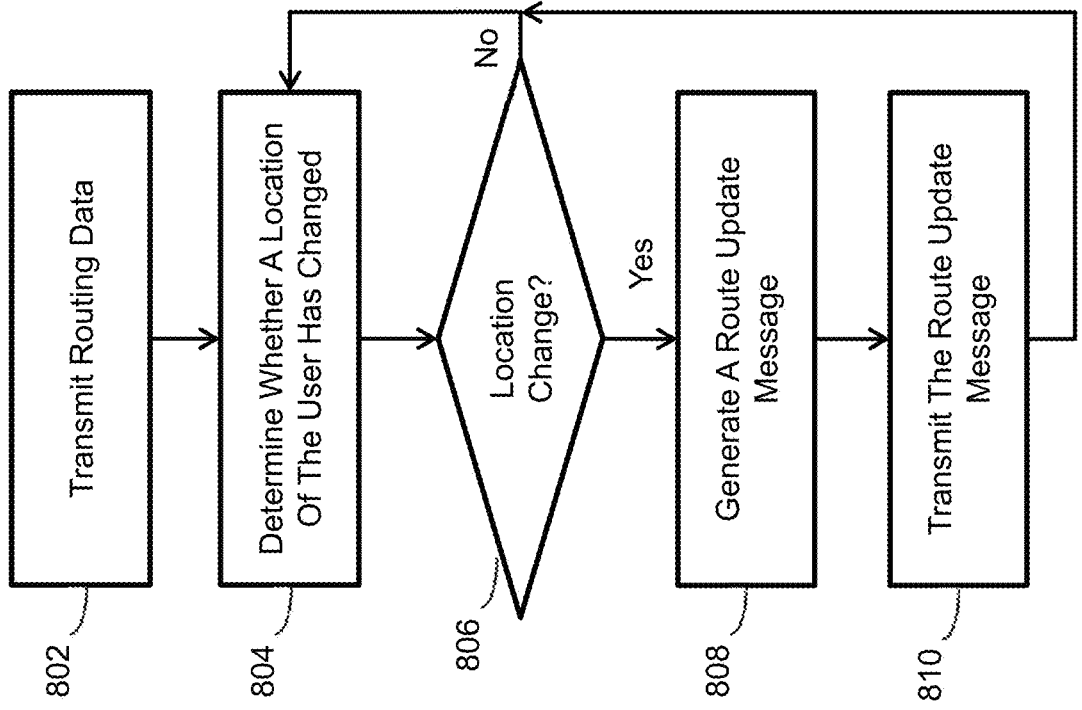
FIG. 8 illustrates another exemplary process for efficiently communicating mapping application data between communicatively coupled electronic devices according to various examples.

FIG. 8 illustrates another exemplary process 800 for efficiently communicating mapping application data between communicatively coupled electronic devices according to various examples. In some examples, process 800 can be performed using electronic devices similar or identical to device 100, 300, 500, 602, or 604. Additionally, in some examples, process 800 can be performed by the first user device of process 700 at block 718 when the map data being transmitted includes navigation or routing data.

At block 802 of process 800, the first user device can transmit the routing data contained in the map data received at block 716 of process 700 to the second user device. In some examples, the routing data can represent a route from a start location to an end location that can be divided into multiple segments, where each segment can correspond to a street, highway, or any other predefined or arbitrary portion of the route. In some examples, the routing data transmitted at block 802 can include one or more of directions for navigating the route from the start location to the end location, map tiles corresponding to the route, traffic data associated with the route, a location of the user, a location of the user along the route, a timestamp, a speed at which the user is traveling, a route segment index value identifying the segment of the route on which the user is currently traveling, or the like.

At block 804, the first user device can determine whether a location of the user has changed. In some examples, this can include determining, at the first user device, whether a location of the first user device (e.g., using Wi-Fi, cellular, GPS, GLONASS, or the like) has changed or has changed by more than a threshold amount. In other examples, block 804 can include receiving a location of the second user device determined by the second user device and determining whether the location of the second user device has changed or has changed by more than a threshold amount. At block 806, if it was determined that the location of the user has not changed (e.g., using either the location determined by the first user device or the second user device), process 800 can return to block 804. Blocks 804 and 806 can repeatedly be performed periodically, intermittently, in response to an input from a user, in response to a request by a mapping and navigation application, or at any other desired frequency or interval of time. Alternatively, if it was instead determined that the location of the user has changed (e.g., using either the location determined by the first user device or the second user device), process 800 can proceed to block 808.

At block 808, the first user device can generate a route update message. The route update message can include less information than contained in the full set of routing data transmitted to the second user device at block 802 and can generally include data sufficient to convey information about a change in the user's position to the second user device. For example, the route update message can include one or more of a location of the user, a location of the user on the route, a speed at which the user is traveling, a route segment index value identifying the segment of the route on which the user is currently traveling, a timestamp associated with the route update message, or the like (e.g., as determined by the second user device). Additionally, the route update message can exclude certain types of information contained in the full set of routing data transmitted to the second user device at block 802, such as the directions for navigating the route from the start location to the end location and/or map tiles corresponding to the route since this information was previously sent to the second user device at block 802.

At block 810, the route update message can be transmitted to the second user device. In some examples, the route update message can be transmitted from the first user device to the second user device using proxy modules (e.g., proxy modules 606 and 610). In response to receiving the route update message, the second user device can update routing information being output by the second user device. For example, if the second user device is displaying a map that highlights the route to be traveled by the user, the second user device can update a current location icon displayed on the highlighted route to show a new current location of the user along the route based on information regarding the user's location contained in the route update message. Similarly, the second user device can update a next direction (e.g., next turn) based on a change in the current segment of the route indicated by the information contained in the route update message.

After transmitting the route update message at block 810, process 800 can return to block 804 where it can again be determined whether the location of the user has changed. Blocks 804, 806, 808, and 810 can repeatedly be performed periodically, intermittently, in response to an input from a user, in response to a request by a mapping and navigation application, or at any other desired frequency or interval of time to monitor and update the location of the user along a route.

Using process 800, a first user device can advantageously be used as a navigation server that provides navigation or route data to a second user device. This can be particularly beneficial when the second user device is incapable of performing the navigation or routing function performed by the first user device or when the second user device's ability to perform these functions is limited by inaccurate location sensors, limited battery power, or the like. Additionally, by providing route updates to the second user device using route update messages rather than full sets of routing data, the amount of data transmitted between the first user device and the second user device can be reduced, thereby reducing the amount of time and power required to provide route updates.

Figure 9:
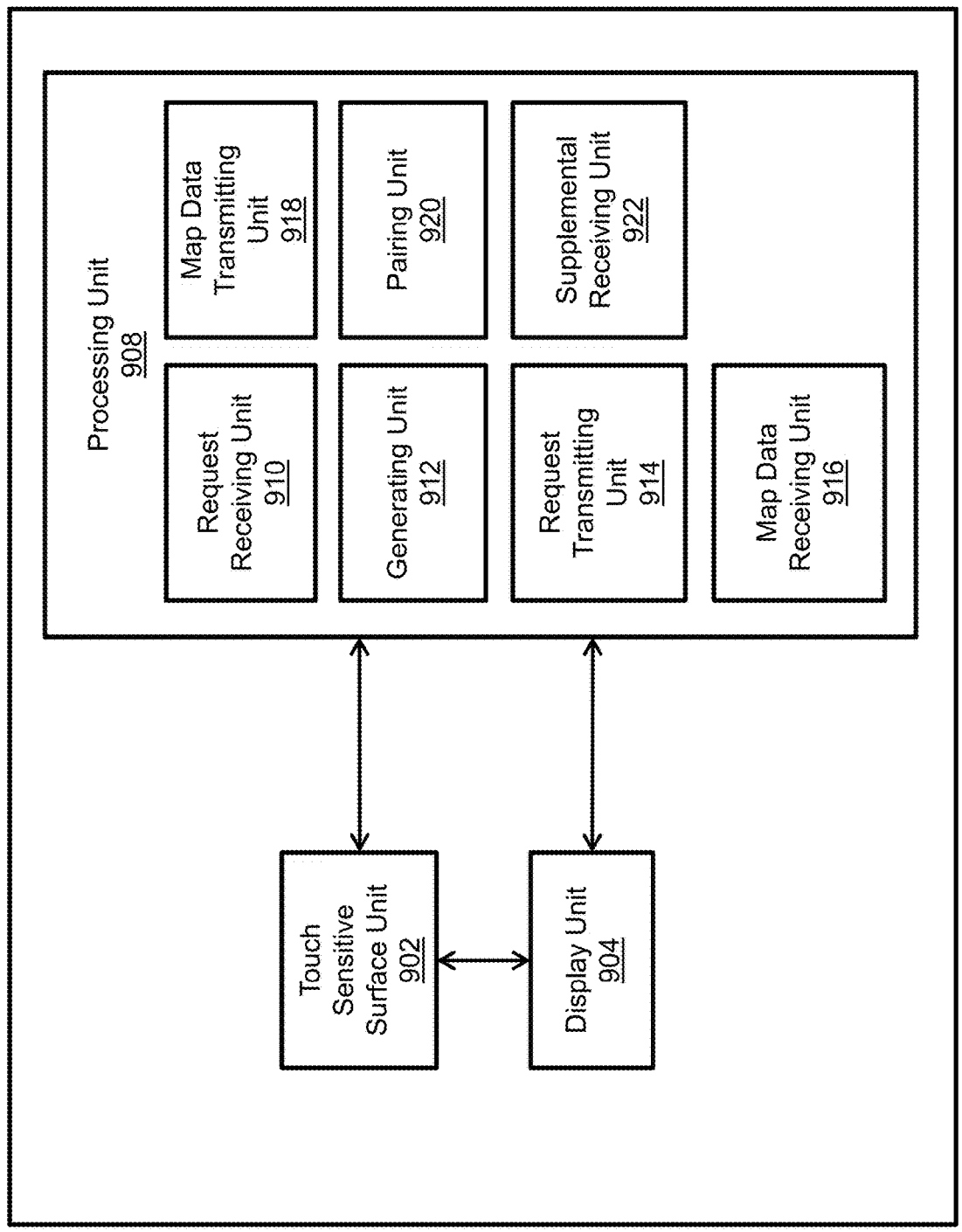
FIG. 9 is a functional block diagram of an electronic device in accordance with some examples.

FIG. 9 shows a functional block diagram of an electronic device 900 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 9 can be combined or separated into sub-blocks to implement the principles of the various described examples. Therefore, the description herein optionally supports any possible combination or separation or further definition of the functional blocks described herein.

As shown in FIG. 9, electronic device 900 can include a display unit 904 configured to display graphical objects, a touch-sensitive surface unit 902 configured to receive user gestures, and a processing unit 908. In some examples, processing unit 908 can include a request receiving unit 910, a generating unit 912, a request transmitting unit 914, a map data receiving unit 916, a map data transmitting unit 918, a pairing unit 920, and a supplemental receiving unit 922.

Processing unit 908 can be configured to receive (e.g., using request receiving unit 910) a first request for map data from a second electronic device. Generating unit 912 can generate a second request for map data based on the first request for map data and request transmitting unit 914 can transmit the second request for map data to a map server. In some examples, the second request for map data comprises a supplemental set of data excluded from the first request for map data. Map data receiving unit 916 can receive map data from the map server and map data transmitting unit 918 can transmit the map data to the second electronic device.

In some examples, the first request for map data and the second request for map data each includes geographic coordinates of the second electronic device. In other examples, the first request for map data and the second request for map data each includes an indication of a type of map data requested by the second electronic device.

In some examples, the supplemental set of data comprises a URL of the map server. In other examples, the supplemental set of data comprises an HTTP request for the map data. In yet other examples, the supplemental set of data comprises a software version of an application stored on the second electronic device. In yet other examples, the supplemental set of data comprises a device identifier of the second electronic device. In yet other examples, the supplemental set of data comprises one or more properties of the second electronic device. In some examples, the one or more properties of the second electronic device include a resolution of a screen of the second electronic device.

In some examples, generating unit 912 can be configured to generate the second request for map data based on the first request for map data by extracting a set of data from the first request for map data, determining the supplemental set of data based the extracted set of data, and generating the second request for map data, wherein the second request for map data comprises the extracted set of data and the supplemental set of data.

In some examples, processing unit 908 can be further configured to pair (e.g., using pairing unit 920) with the second electronic device prior to receiving the first request for map data.

Figure 10:
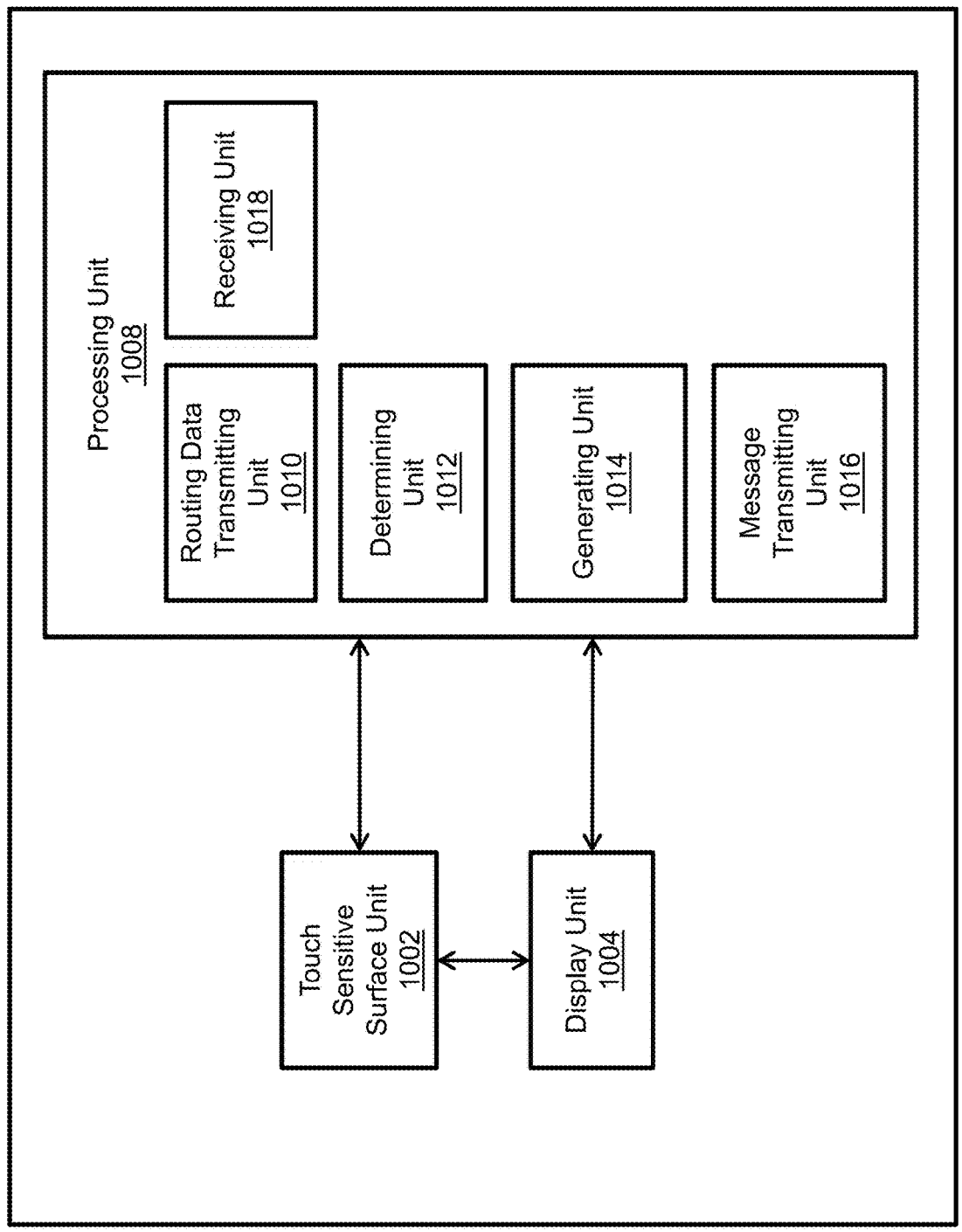
FIG. 10 is a functional block diagram of another electronic device in accordance with some examples.

In some examples, processing unit 908 can be further configured to receive (e.g., using supplemental receiving unit 922) the supplemental set of data after pairing with the second electronic device and prior to receiving the first request for map data from the second electronic device. In some examples, the map data includes one or more map tiles, a set of geographic coordinates, routing information from a start location to an end location, or traffic data FIG. 10 shows a functional block diagram of an electronic device 1000 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 10 can be combined or separated into sub-blocks to implement the principles of the various described examples. Therefore, the description herein optionally supports any possible combination or separation or further definition of the functional blocks described herein.

As shown in FIG. 10, electronic device 1000 can include a display unit 1004 configured to display graphical objects, a touch-sensitive surface unit 1002 configured to receive user gestures, and a processing unit 1008. In some examples, processing unit 1008 can include a routing data transmitting unit 1010, a determining unit 1012, a generating unit 1014, a route update message transmitting unit 1016, and receiving unit 1018.

Processing unit 1008 can be configured to transmit (e.g., using routing data transmitting unit 1010) routing data to a second electronic device, wherein the routing data represents a route from a start location to an end location to be traveled by a user. Determining unit 1012 can determine whether a location of the user has changed. Generating unit 1014 can generate a route update message representing the change of the location of the user in accordance with a determination that the location of the user has changed. Route update message transmitting unit 1016 can transmit the route update message to the second electronic device.

In some examples, the routing data can include a set of directions for navigating the route from the start location to the end location. In other examples, the route update message excludes the set of directions for navigating the route from the start location to the end location. In yet other examples, the routing data includes a plurality of map tiles corresponding to the route. In yet other examples, the route update message excludes the plurality of map tiles corresponding to the route. In yet other examples, the route update message comprises a location of the user. In yet other examples, the route update message comprises a location of the user on the route. In yet other examples, the route update message comprises a timestamp. In yet other examples, the route update message comprises a speed of the user.

In some examples, the route includes a plurality of route segments and the update message includes a route segment index value representing a segment of the plurality of route segments associated with the location of the user.

In some examples, processing unit 1008 can be further configured to receive (e.g., using receiving unit 1018) the routing data from a map server prior to transmitting the routing data to the second electronic device.

In some examples, determining unit 1012 can be configured to determine whether the location of the user has changed by determining, at the first electronic device, a location of the first electronic device and determining whether the location of the first electronic device is different than a previous location of the first electronic device by more than a threshold amount.

In other examples, determining unit 1012 can be configured to determine whether the location of the user has changed by receiving, at the first electronic device, a location of the second electronic device and determining whether the location of the second electronic device is different than a previous location of the second electronic device by more than a threshold amount.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the appended claims.

What is claimed is:

1. A first electronic device comprising a non-transitory machine readable medium storing a program, the program comprising sets of instructions for:

pairing, by the first electronic device, with a second electronic device, wherein the first electronic device receives at least one device attribute of the second electronic device during the pairing, and wherein the first electronic device and the second electronic device are associated with an end user account for a user;

storing, by the first electronic device, the at least one device attribute for the second electronic device;

receiving, from the second electronic device, a first request for map data to be provided by a map server, the first request including one or more map data request attributes;

generating, by the first electronic device, a second request for map data that includes the stored at least one device attribute and the one or more map data request attributes;

transmitting the second request for map data to the map server;

receiving map data from the map server; and transmitting the map data to the second electronic device, wherein the second electronic device is configured to present the map data on a display screen of the second electronic device.

2. The first electronic device of claim 1, wherein the first request for map data and the second request for map data each comprises geographic coordinates of the second electronic device.

3. The first electronic device of claim 1, wherein the first request for map data and the second request for map data each comprises an indication of a type of map data requested by the second electronic device.

4. The first electronic device of claim 1, wherein the at least one device attribute of the second electronic device comprises a resolution of a screen of the second electronic device.

5. The first electronic device of claim 1, wherein the program further comprises a set of instructions for pairing with the second electronic device before receiving the first request for map data from the second electronic device.

6. The first electronic device of claim 1, wherein the map data comprises:
one or more map tiles;
a set of geographic coordinates;
routing information from a start location to an end location; or
traffic data.

7. The first electronic device of claim 1, wherein the first electronic device is a mobile phone and the second electronic device is a watch.

8. The first electronic device of claim 1, wherein the pairing further comprises:
transmitting, by the first electronic device, a first pairing message to the second electronic device; and
receiving, by the first electronic device, a second pairing message from the second electronic device, the second pairing message including the at least one device attribute of the second electronic device.

9. The first electronic device of claim 1, wherein the at least one device attribute includes at least one of an operating system attribute, an operating system version, a device identifier, and a screen size attribute.

10. The first electronic device of claim 1, wherein the pairing further comprises establishing a direct communication connection between the first electronic device and the second electronic device, the direct communication connection utilizing a first communication protocol, the first communication protocol including one of Bluetooth, near-field communication (NFC), and Bluetooth Low Energy.

11. The first electronic device of claim 1, wherein the first electronic device and the second electronic device are end user devices.

12. The first electronic device of claim 1, wherein the one or more map data request attributes include location data for the second electronic device, wherein the location data identifies a current location of the second electronic device.

13. The first electronic device of claim 1, wherein the one or more map data request attributes include a type of map data requested, wherein the type of map data requested is selected from map tile data, a first set of geographical coordinates produced from a geocoding process, a geocoding result of a reverse geocoding operation that uses a second set of geographic coordinates provided by the second user device, routing data from a start location to an end location, and traffic data.

14. A method performed by a first electronic device, the method comprising:
pairing, by the first electronic device, with a second electronic device, wherein the first electronic device receives at least one device attribute of the second electronic device during the pairing, and wherein the first electronic device and the second electronic device are associated with an end user account for a user;
storing, by the first electronic device, the at least one device attribute for the second electronic device;
receiving, from the second electronic device, a first request for map data to be provided by a map server, the first request including one or more map data request attributes and excluding the at least one device attribute;
in response to the first request, generating, by the first electronic device, a second request for map data that includes the stored at least one device attribute received during the pairing and the one or more map data request attributes received in the first request;
transmitting the second request for map data to the map server;
receiving map data from the map server; and
transmitting the map data to the second electronic device, wherein the second electronic device is configured to present the map data on a display screen of the second electronic device.

15. The method of claim 14, wherein the first request for map data and the second request for map data each comprises geographic coordinates of the second electronic device.

16. The method of claim 14, wherein the first request for map data and the second request for map data each comprises an indication of a type of map data requested by the second electronic device.

17. The method of claim 14, further comprising pairing with the second electronic device before receiving the first request for map data from the second electronic device.

18. The method of claim 14, wherein the map data comprises:
one or more map tiles;
a set of geographic coordinates;
routing information from a start location to an end location; or
traffic data.

19. The method of claim 14, wherein the first electronic device is a mobile phone and the second electronic device is a watch.

20. The method of claim 14, wherein the pairing further comprises:
transmitting, by the first electronic device, a first pairing message to the second electronic device; and
receiving, by the first electronic device, a second pairing message from the second electronic device, the second pairing message including the at least one device attribute of the second electronic device.

21. The method of claim 14, wherein the at least one device attribute includes at least one of an operating system attribute, an operating system version, a device identifier, a screen size attribute, and a screen resolution attribute.

22. The method of claim 14, wherein the pairing further comprises establishing a direct communication connection between the first electronic device and the second electronic device, the direct communication connection utilizing a first communication protocol, the first communication protocol including one of Bluetooth, near-field communication (NFC), and Bluetooth Low Energy.

23. The method of claim 14, wherein the first electronic device and the second electronic device are end user devices.

24. The method of claim 14, wherein the one or more map data request attributes include location data for the second electronic device, wherein the location data identifies a current location of the second electronic device.

25. The method of claim 14, wherein the one or more map data request attributes include a type of map data requested, wherein the type of map data requested is selected from map tile data, a first set of geographical coordinates produced from a geocoding process, a geocoding result of a reverse geocoding operation that uses a second set of geographic coordinates provided by the second user device, routing data from a start location to an end location, and traffic data.

* * * * *